United States Patent

Shimogama et al.

[11] Patent Number: 5,834,916
[45] Date of Patent: Nov. 10, 1998

[54] INDUSTRIAL ROBOT AND ITS CONTROL UNIT

[75] Inventors: Shigeru Shimogama, Kawanishi; Hiroshi Nakajima, Itami; Yoshinori Sasaki, Sakai, all of Japan

[73] Assignee: Matsushita Electric Industrial Co., Ltd., Osaka-fu, Japan

[21] Appl. No.: 697,162

[22] Filed: Aug. 20, 1996

[30] Foreign Application Priority Data

Aug. 30, 1995 [JP] Japan .................................. 7-221342

[51] Int. Cl.⁶ ........................................................ B25J 9/22
[52] U.S. Cl. ................................ 318/568.13; 318/568.11; 318/568.18; 318/568.24; 901/49; 901/50; 388/900; 364/185; 361/23
[58] Field of Search .......................... 318/568.13, 568.11, 318/568.18, 568.24; 901/49, 50; 388/900; 364/185; 361/23

[56] References Cited

U.S. PATENT DOCUMENTS

| | | | |
|---|---|---|---|
| 4,542,471 | 9/1985 | Inaba et al. | 318/568 X |
| 5,075,870 | 12/1991 | Kojyo et al. | 318/568.22 X |
| 5,254,921 | 10/1993 | Matsubara | 318/568.11 X |

FOREIGN PATENT DOCUMENTS 2-133704  11/1990  Japan .
4-235610   8/1992  Japan .

*Primary Examiner*—Karen Masih
*Attorney, Agent, or Firm*—Wenderoth, Lind & Ponack, L.L.P.

[57] ABSTRACT

A control unit for an industrial robot comprising a speed command device for outputting a speed command signal for the industrial robot and a servo control device which outputs to a servo motor of each of a plurality of axes of rotation of the industrial robot, in response to the speed command signal, an electric current corresponding to the speed command signal. The servo control performs feedback control of the industrial robot, in response to a signal from an encoder of each of the axes of rotation of the industrial robot, so as to actuate the servo motor at a speed designated by the speed command signal. The speed command device includes a comparison member for comparing an actual speed of the industrial robot calculated from a pulse train of a signal returning from the encoder with the speed designated by the speed command signal. When a difference between the actual speed of the industrial robot and the speed designated by the speed command signal exceeds a predetermined permissible value, the comparison member performs an abnormality eliminating process of the industrial robot.

18 Claims, 3 Drawing Sheets

INDUSTRIAL ROBOT AND ITS CONTROL UNIT

BACKGROUND OF THE INVENTION

The present invention relates to an industrial robot and its control unit.

In a conventional positioning control of a robot, a value proportional to the amount of rotation of a motor for each axis of rotation of a robot body is fed back from a sensor coupled to the motor. An absolute encoder and an incremental encoder is generally used as the sensors.

The absolute encoder is generally used such that, at the time when a power source of a robot control unit is turned on, the current position of the robot is recognized by the absolute encoder which acts as an absolute position sensor. Next, the position of the robot is controlled relatively by the incremental encoder which acts as a relative position sensor. This arrangement is used because data processing of the incremental encoder is more suitable for quick positional and speed control than the absolute encoder which is based on serial data communication.

On the other hand, at the time of the next turning on of the power source of the robot control after turning off of the power source, since the current position of the robot cannot be recognized by the incremental encoder alone, it becomes necessary to detect the original position of the robot through so-called "origin return". However, in some actual operating environments of the robot, space for origin return of the robot may not be available. In addition, the absolute encoder, which enables prompt recognition of the current position of the robot, is far more useful for an operator than the incremental encoder. For these reasons, both the absolute encoder and the incremental encoder are combinationally used in the present invention.

Furthermore, the absolute encoder is conventionally used only at the time of turning on the power source of the robot control unit in the above mentioned example. Thus, a robot control unit, designed to utilize the absolute encoder more effectively from a safety standpoint, is proposed, for example, in Japanese Patent Laid-Open Publication No. 4-235610 (1992). In this known robot control unit, the calculated results of the current position of the robot, obtained by the absolute encoder and by the incremental encoder, are compared with each other on real-time basis at all times during operation of the robot such that runaway or inaccurate positioning of the robot, due to the position detecting sensors, is prevented.

However, in this known robot control unit, a problem arises such that, since the feedback amount, which is proportional to the rotational amount of a motor for each axis of a manipulator, from the absolute encoder and from the incremental encoder are compared with each other and since these amounts should be naturally coincident with each other at all times, defects other than great hardware defects such as fracture of a shaft or the like cannot be detected.

Furthermore, another robot control unit, in which malfunctions of an encoder signal transmission system or the encoders themselves can be detected immediately by hardware, is proposed, for example, in Japanese Utility Model Laid-Open Publication No. 2-133704 (1990). The defects of the absolute position sensor can be detected immediately and positively on real-time basis by hardware. However, this prior art robot control unit also has a drawback in that defects other than hardware defects such as breaking of control cables and the like cannot be detected.

SUMMARY OF THE INVENTION

Accordingly, an essential object of the present invention is to provide, with a view towards eliminating the above mentioned disadvantages of the prior art, an industrial robot and its control unit in which, by monitoring whether or not actual speed and command speed of each axis of a manipulator are coincident with each other, the industrial robot can be controlled safely and positively.

The afore-mentioned object of the present invention is achieved by sequentially obtaining an accurate actual speed of a motor from the number of feedback pulses per unit of time and a follow-up speed is obtained by calculating a difference between the actual speed and a command speed. Furthermore, present invention provides a main CPU in addition to a servo CPU, such that it is possible to detect, using the main CPU, that the command speed and the actual speed are different from each other even when, due to a malfunction of the like, the servo CPU has incorrectly determined that the command speed and the actual speed are coincident with each other. Thus, the present invention provide a double monitoring of the actual speed of the motor, thereby allowing a safe control of the industrial robot.

Moreover, the present invention provides an incremental encoder and an absolute encoder for feedback pulses per unit of time. Either the incremental encoder of absolute encoder may be used, or both of the encoders by using one of the main CPU and the servo CPU and comparing such speed with the command speed using the main CPU. Although only one of the encoders is needed to obtain the actual speed of the motor, the actual speed can be safely monitored even if a failure of one of the encoders occurs, thereby allowing a safe control of the industrial robot.

BRIEF DESCRIPTION OF THE DRAWINGS

The objects and features of the present invention will become apparent from the following description taken in conjunction with the preferred embodiments thereof with reference to the accompanying drawings, in which.

It is noted that like parts are designated by like reference numerals throughout several views of the accompanying drawings.

DETAILED DESCRIPTION OF THE INVENTION

Hereinafter, a double monitoring of the actual speed of an industrial robot according to one embodiment of the present invention is described with reference to the drawings.

Figure 3:
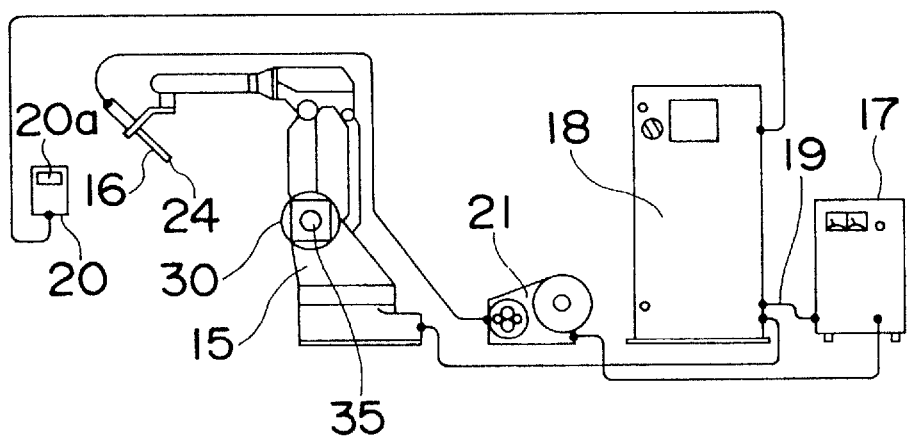
FIG. 3 is a schematic view showing the configuration of an arc welding robot system in which the industrial robot of FIG. 2 is applied.

FIG. 3 shows a configuration of an arc welding robot system in which the industrial robot of the present invention is applied. The arc welding robot system includes a robot body (manipulator) 15 which is an articulated industrial robot having six axes of rotation. An arc welding torch 16 is mounted on a wrist of the robot body 15. Upon transmission of a welding command from a robot control unit 18 to an arc welding power source 17 through a welding interface cable 19, a welding wire 24 is fed to the torch 16 by a wire feeder 21 such that welding is performed. A teaching pendant 20 used for providing instructions to the robot, has a liquid crystal display 20a for displaying information on the operational state of the robot, welding, and other information related to the robot.

Figure 1:
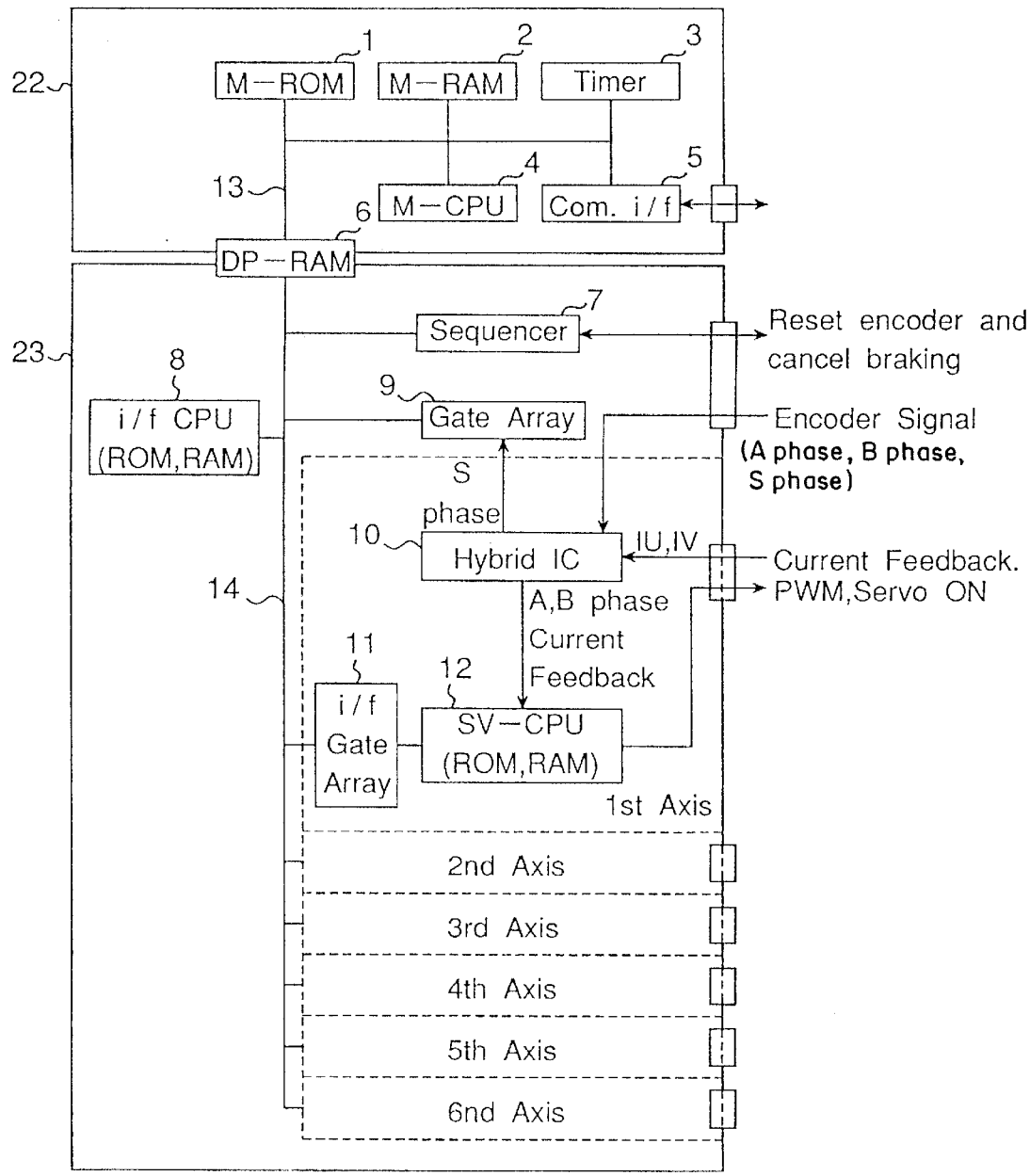
FIG. 1 is a fragmentary block diagram of a control unit for an industrial robot, according to one embodiment of the present invention.

FIG. 1 shows a control unit for an industrial robot according to one embodiment of the present invention. The control unit includes a main CPU section 22 used mainly for giving operational commands to the robot and for performing necessary controls for the man-machine interface which has the teaching pendant 20 as its inlet or input. The control unit also includes a servo CPU section 23 used mainly for performing operational control of the robot. In this embodiment, the main CPU section 22 acts as a speed command means, which the servo CPU section 23 acts as a servo control means.

Hereinafter, configuration of the main CPU section 22 is described. The main CPU section 22 includes a main CPU 4, for controlling the robot as a whole, a main ROM 1 in which software (programs) describing processes to be executed by the main CPU 4 is stored, and a main RAM 2 in which rewritable data such as, for example, teaching data, operational sequences of the robot, and parameters for welding and the robot are stored. The main CPU 4 has access to the main RAM 2. The main CPU section 22 further includes a timer 3 for informing the main CPU 4 of lapses of time and time points of polling processing, a communication interface 5 for receiving data from or delivering data to a welding machine and external sequencer signals, and a dual port (DP)-RAM 6 for exchanging information between the main CPU section 22 and the servo CPU section 23 section. Meanwhile, data buses 13 and 14 are used for exchanging data among the devices.

Hereinafter, the servo CPU section 23 is described. A servo system is constituted by the servo CPU section 23 for controlling the position, speed, and electric current of the robot, an AC servo motor 30 for each axis of rotation of the robot body 15, and an AC servo driver (not shown) for controlling the servo motor 30 by using pulse width modulation (PWM) signals generated from a control circuit of the servo CPU section 23. The servo CPU section 23 includes a sequencer, 7 which supplies electric power to an encoder 35 for the servo motor 30 in response to the turning on of a control power source of the robot or in response to the cancellation of braking of the AC servo motor 30 after the start of servo control, an interface CPU 8 which is provided between the main CPU 4 and a servo CPU 12 for each axis of rotation of the robot body 15 so as to decrease the load of data communication on the servo CPU 12 and a gate array 9 exclusively used for processing sequentially transmitted data of an absolute encoder. In this embodiment, the servo CPU 12 is formed by a single chip of an 32-bit reduced instruction set computer (RISC) which performs high-speed control operations by using a RISC core, AND, and OR circuits incorporated therein. The servo CPU 12 incorporates five multifunctional counters. The first and second counters operate so as to count signals of an incremental encoder four times and the third counter operates so as to count the pulses of the incremental encoder. Furthermore, the fourth counter calculates positional feedback values based on the signals of the incremental encoder counted four times and the fifth counter calculates speed feedback values based on the pulses of the incremental encoder counted such that the servo CPU 12 outputs PWM signals in accordance with the speed feedback values.

The servo CPU section 23 further includes a hybrid IC 10 which shapes waveforms by receiving signals from the absolute encoder and the incremental encoder, which act as positional sensors, so as to send the signals of the absolute encoder and the incremental encoder to the gate array 9 and the servo CPU 12, respectively. The hybrid IC 10 incorporates a sample and hold (S/H) circuit and an analog-to-digital (A/D) convertor. Thus, the U-phase and V-phase electric currents of the AC servo motor 30 are subjected to sampling by the S/H circuit and are converted into digital data by the A/D convertor so as to be applied to the servo CPU 12 as feedback values of the electric current of the AC servo motor 30.

Furthermore, the servo CPU section 23 includes an interface gate array 11 which is a first-in first-out (FIFO) stack which acts as a communication interface between the interface CPU 8 and the servo CPU 12 and also produces hold signals for the S/H circuit.

It is to be noted that the hybrid IC 10, the interface gate array 11 and the servo CPU 12 are provided for each axis of rotation of the robot body 15.

A positional loop is formed by implementing proportional control in which a deviation counter holds the differences between common pulses and feedback pulses so as to perform processing by implementing positional interruption. Meanwhile, a speed loop is formed by implementing proportional integral control in which highly accurate speed feedback signals are secured by performing 32-bit operations. In the servo CPU 12, the pulse count and the time count are held in each register synchronously with an input edge of pulses of the encoder 35 and the counts are simultaneously fetched into the servo CPU 12 such that the speed feedback values are calculated by obtaining the differences between the counts and the preceding counts. Therefore, not only is it possible to obtain the average speed immediately before the counts are fetched into the servo CPU 12, but it is also possible to obtain highly accurate speed feedback values which range from low speeds to high speeds.

Figure 2:
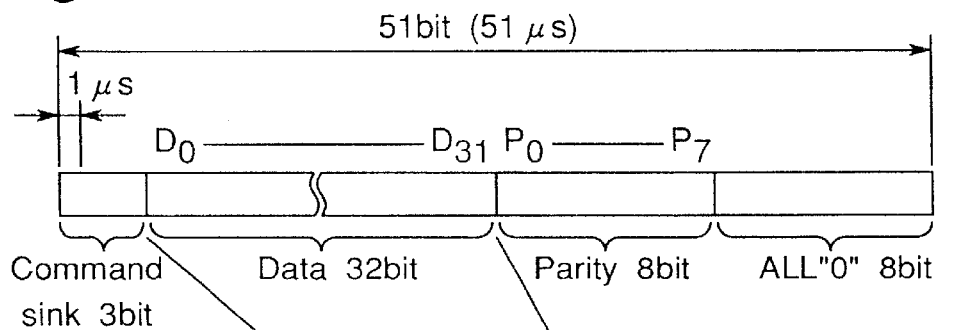
FIG. 2 is a view indicative of the communication protocol of an absolute encoder of an industrial robot according to one embodiment of the present invention.

FIG. 2 shows a communication protocol of the absolute encoder of the industrial robot according to one embodiment of the present invention. As shown in FIG. 2, after a power source of the absolute encoder has been turned on, signals on the integral number of rotations of the servo motor 30 of each axis of rotation of the robot body 15 and a fraction of one rotation of the servo motor 30 are, at all times, transmitted as serial data to the gate array 9 via the hybrid IC 10 for each axis of rotation of the robot body 15 at a baud rate of 1 Mbps and at a period of 51 $\mu$sec.

The gate array 9 receives the absolute data of each axis of rotation of the robot body 15 through a changeover of channels of the respective rotational axes. The absolute data is binary data of the integral number of the rotations of the servo motor 30 and the fraction of one rotation of the servo motor 30. The gate array 9 sequentially changes over the channels of the respective axes of rotation of the robot body 15 at all times so as to write the integral number of the rotations of the servo motor 30 for each axis of rotation of the robot body 15 and the fraction of one rotation of the servo motor 30 in the DP-RAM 6. A maximum time of 1 msec. is required for the gate array 9 to process the absolute data for a total of the six axes of rotation of the robot body 15.

After start of the servo control, the main CPU 4 receives, at an interval of 25 msec., the integral number of rotations of the servo motor 30 of each rotational axis of the robot body 15 and the fraction of one rotation of the servo motor 30 written in the DP-RAM 6. The main CPU 4 then calculates the speed of each axis of rotation of the robot body 15 by taking the differences between the received values and the preceding values written in the main RAM 2 so as to rewrite the data in an address assigned for the preceding values.

Subsequently, the main CPU 4 takes a difference between the above mentioned speed of each axis of rotation of the robot body 15 and a command speed given to the main CPU 4 from the servo CPU 12 for each axis of rotation of the robot body 15 so as to judge whether or not the difference falls within a permissible range. If the difference falls out of the permissible range, the main CPU 4 judges that a malfunction of the servo CPU 12 has occurred or a defect in the positional sensors or the wiring therebetween exists. The main CPU 4 then performs emergency stop processing. Namely, the main CPU 4 turns off a power source of the AC servo motor 30, displays "Abnormal speed monitoring" in the liquid crystal display 20a of the teaching pendant 20, and outputs an external signal (not shown) indicative of the abnormality of the robot system.

As described above, the main CPU 4 in the main CPU section 22, acting as the speed command means, is used also as a comparison means in this embodiment.

Furthermore, in this embodiment, the speed of the robot body 15 is monitored by the main CPU 4. However, it is noted that the speed may also be monitored by another CPU or a hardware means. Furthermore, the serial data of the absolute encoder is employed for monitoring the speed of the robot body 15, but may also be replaced by the speed feedback values of the servo CPU 12. In addition, when the abnormal speed occurs, it is noted that the emergency stop processing may also be replaced by a temporary stop processing in which the servo CPU 12 is reset for each axis of rotation of the robot body 15 and the current position of the robot is again set by using data of the absolute encoder such that the robot can be restarted.

As described above, in the industrial robot in which motion and positioning of the robot are controlled by using the positional sensors, the control unit for the industrial robot includes the main CPU 4 for providing the operational commands to the robot and the servo CPU 12 for performing the operational control of the robot. The CPU, other than the servo CPU 12 and the main CPU 4 in this embodiment, is used as the comparison means which compares the command speed with the calculated actual speed obtained by performing data processing of the positional sensors at the preset period. When the difference between the two speeds exceeds a permissible value, the main CPU 4 performs the emergency stop processing. Therefore, in this embodiment, the main CPU 4 itself provides the operational commands to the robot and monitors whether or not the actual speed and the command speed of each axis of rotation of the robot body coincide with each other. As a result, in this embodiment, since the actual speed of each axis of rotation of the robot body can be monitored by the two CPUs, i.e., the main CPU 4 and the servo CPU 12, the robot can be made safer.

As will be seen from the foregoing description of the industrial robot and its control unit of the present invention, when electric power is provided to the power source of the servo motor of the robot body, the speed of each axis of rotation of the robot body is monitored by not only the servo control means but also by the comparison means. As a result, an accidental abnormality of the robot can be restrained, thereby resulting in remarkable rise of the reliability of the robot.

What is claimed is:

1. A control unit for controlling at least one servo motor in response to at least one respective encoder signal, said control unit comprising:

a speed command means for outputting a speed command signal for the at least one servo motor and for calculating an actual speed of the at least one servo motor based upon the at least one respective encoder signal; and a servo control means for outputting electric current, corresponding to the speed command signal, to the at least one servo motor, and for performing feedback control of the at least one servo motor in response to the at least one respective encoder signal so as to actuate the at least one servo motor at a speed designated by the speed command signal;

wherein said speed command means comprises a comparison means for comparing the actual speed of the at least one servo motor and the speed designated by the speed command signal and for performing an abnormality eliminating process for the at least one servo motor when a difference between the actual speed and the speed designated by the speed command signal exceeds a predetermined value.

2. A control unit as claimed in claim 1, wherein the abnormality eliminating process comprises performing an emergency stop of the at least one servo motor and outputting an external signal indicative of an occurrence of the abnormality eliminating process for the at least one servo motor.

3. A control unit as claimed in claim 1, wherein the abnormality eliminating process comprises performing a temporary emergency stop of the at least one servo motor and outputting an external signal indicative of an occurrence of the abnormality eliminating process for the at least one servo motor.

4. A control unit as claimed in claim 1, wherein the abnormality eliminating process comprises performing an emergency stop of the at least one servo motor and displaying an indication of an occurrence of the abnormality eliminating process for the at least one servo motor.

5. A control unit as claimed in claim 4, wherein the abnormality eliminating process further comprises outputting an external signal indicative of an occurrence of the abnormality eliminating process for the at least one servo motor.

6. A control unit as claimed in claim 1, wherein the abnormality eliminating process comprises performing a temporary emergency stop of the at least one servo motor and displaying an indication of an occurrence of the abnormality eliminating process for the at least one servo motor.

7. A control unit as claimed in claim 6, wherein the abnormality eliminating process further comprises outputting an external signal indicative of an occurrence of the abnormality eliminating process for the at least one servo motor.

8. An industrial robot comprising:

at least one servo motor;

an encoder corresponding to said at least one servo motor, wherein said encoder transmits an encoder signal;

a speed command means for outputting a speed command signal for said at least one servo motor and for calculating an actual speed of said at least one servo motor based upon the encoder signal; and a servo control means for outputting electric current, corresponding to the speed command signal, to said at least one servo motor, and for performing feedback control of said at least one servo motor in response to the encoder signal so as to actuate said at least one servo motor at a speed designated by the speed command signal;

wherein said speed command means comprises a comparison means for comparing the actual speed of said at least one servo motor and the speed designated by the speed command signal and for performing an abnormality eliminating process for said at least one servo motor when a difference between the actual speed and the speed designated by the speed command signal exceeds a predetermined value.

9. An industrial robot as claimed in claim 8, wherein said encoder is an absolute encoder.

10. An industrial robot as claimed in claim 8, wherein said encoder is an incremental encoder.

11. An industrial robot as claimed in claim 8, wherein said encoder is comprised of an absolute encoder and an incremental encoder.

12. An industrial robot as claimed in claim 8, wherein the abnormality eliminating process comprises performing an emergency stop of said at least one servo motor and outputting an external signal indicative of an occurrence of the abnormality eliminating process for said at least one servo motor.

13. An industrial robot as claimed in claim 8, wherein the abnormality eliminating process comprises performing a temporary emergency stop of said at least one servo motor and outputting an external signal indicative of an occurrence of the abnormality eliminating process for said at least one servo motor.

14. An industrial robot as claimed in claim 8, further comprising a user interface means for inputting instructions and for displaying information.

15. An industrial robot as claimed in claim 14, wherein the abnormality eliminating process comprises performing an emergency stop of said at least one servo motor and displaying an indication of an occurrence of the abnormality eliminating process for said at least one servo motor on said user interface means.

16. An industrial robot as claimed in claim 15, wherein the abnormality eliminating process further comprises outputting an external signal indicative of an occurrence of the abnormality eliminating process for said at least one servo motor.

17. An industrial robot as claimed in claim 14, wherein the abnormality eliminating process comprises performing a temporary emergency stop of said at least one servo motor and displaying an indication of an occurrence of the abnormality eliminating process for said at least one servo motor on said user interface means.

18. An industrial robot as claimed in claim 17, wherein the abnormality eliminating process further comprises outputting an external signal indicative of an occurrence of the abnormality eliminating process for said at least one servo motor.

\* \* \* \* \*